United States Patent [19]
Hirata

[11] Patent Number: 5,053,802
[45] Date of Patent: Oct. 1, 1991

[54] ELECTRIC FLASH APPARATUS

[75] Inventor: Shinji Hirata, Toyonaka, Japan

[73] Assignee: West Electric Co., Ltd., Osaka, Japan

[21] Appl. No.: 503,180

[22] Filed: Mar. 28, 1990

[30] Foreign Application Priority Data

Mar. 29, 1989 [JP] Japan .................................. 1-78887

[51] Int. Cl.[5] ............................................. G03B 7/00
[52] U.S. Cl. ................................. 354/416; 354/145.1
[58] Field of Search ...................... 354/416, 145.1, 413, 354/417, 419; 315/241 P

[56] References Cited

U.S. PATENT DOCUMENTS 4,697,906 10/1987 Kobayashi et al. ................ 354/416
4,839,686 6/1989 Hosomizu et al. .................. 354/416

FOREIGN PATENT DOCUMENTS 63-129327 6/1988 Japan .

*Primary Examiner*—E. T. Hix
*Assistant Examiner*—David M. Gray
*Attorney, Agent, or Firm*—Cushman, Darby & Cushman

[57] ABSTRACT

An electric flash apparatus of the present invention is actuated to emit light by application of a trigger signal issues by a trigger circuit (5) after a power transistor (4), such as, an I.G.B.T. (insulated gate bipolar transistor) connected in series with a flash tube (3), is certainly turned to sufficient ON state.

10 Claims, 8 Drawing Sheets

ELECTRIC FLASH APPARATUS

FIELD OF THE INVENTION AND RELATED ART STATEMENT

1. Field of the Invention

The present invention relates to an electric flash apparatus using a power transistor, such as, an insulated gate bipolar transistor (hereinafter referred to as: I.G.B.T.), which is connected in series to a flash tube, and more particularly to an electric flash apparatus using a power source of the power transistor for controlling a trigger circuit for the flash tube.

2. Description of the Related Art

A conventional electric flash apparatus of a type using a power transistor which is connected in series to a flash tube is disclosed in, for example, the U.S. Pat. No. 4,697,906, as shown in FIG. 7, which was filed by the same assignee.

In the above-mentioned conventional electric flash apparatus, a main capacitor 2, a trigger capacitor 6 of a trigger circuit 5 and a capacitor 8 for voltage multiplying are charged with the polarity as shown in FIG. 7, when a DC high voltage power supply circuit 1 is operated.

In the above-mentioned circumstance, when a synchronous switch 11 which is actuated by a shutter mechanism of a camera is closed, an ON-signal generating circuit 10 issues an ON signal having high electric potential level. The ON-signal is applied to the power transistor 34 and the gate of the thyristor 9, to turn them ON.

When the power transistor 34 and the thyristor 9 turn ON, the electric charge of the trigger capacitor 6 is discharged through the power transistor 34, the thyristor 9, and a primary winding of a trigger transformer T. Hence, the flash tube 3 is excited by the operation of the trigger circuit 5.

At the time, the charged voltage of the capacitor 8 is added to the charged voltage of the main capacitor 2 through the power transistor 34 and the thyristor 9. The flash tube 3 emits light by using the electric charge of the main capacitor 2.

While the flash tube 3 emits light, a light receiving sensor 13 detects the light reflected from the object. When integration value of the light detected by the light receiving sensor 13 reaches a preset value, a light control circuit 12 issues an OFF signal for stopping discharge in the flash tube 3. Therefore, the afore-mentioned ON signal which has been issued to the power transistor 34 and the gate of the thyristor 9 is stopped. Therefore, the power transistor 34 and the thyristor 9 turn OFF, and hence the flash tube 3 stops its light emission. Diodes 7 and 14 are for preventing flow of undesirable reverse current.

In the above-mentioned operation of the conventional electric flash apparatus shown in FIG. 7, there is the following problem. In the basic operation of this type of conventional electric flash apparatus, the thyristor 9 should turn ON and operate the trigger circuit 5, simultaneously or after the perfect turn ON of the power transistor 34.

As above-mentioned, in the conventional apparatus of FIG. 7, the ON signal is applied to both the power transistor 34 and the gate of the thyristor 9 at the same time by the ON-signal generating circuit 10. Therefore, in case where the electric potential level of the ON signal is low or the base of the power transistor 34 does not reach a sufficient level owing to a stray capacitance of the power transistor 34, there is a possibility that the thyristor 9 is turned ON even when the level of the ON signal at the base does not reach sufficient level yet.

In other words, there is a possibility that the thyristor 9 turns ON the turning ON of the power transistor 34 is not yet completely accomplished. In such situation, the power transistor 34 has a comparatively high impedance, and hence the trigger circuit 5 is operated in an inefficient state. Consequently, there is often a case where the flash tube 3 can not emit light. Furthermore, even when the flash tube 3 can narrowly emit light, there is a possibility of damaging the power transistor 34 under incomplete ON state by the supply of a large electric power from the main capacitor 2.

In another prior art apparatus, i.e. the electric flash apparatus disclosed in the published unexamined patent application in Japan No. Sho 63-129327, which was filed by the same assignee. This prior art discloses that a power transistor is prevented from being broken by discharging when the power transistor does not yet completely turn ON. The above-mentioned conventional electric flash apparatus discloses that two separate power sources are provided for operation control of the trigger circuit and for driving a power transistor. The above-mentioned apparatus comprises a switching device in the loop for supplying current for the base of the power transistor which is connected in series to a flash tube. And furthermore, it comprises a voltage detecting circuit for detecting the output voltage for the power source which is supplied to the base of the power transistor. And therefore, if the detected voltage is below a predetermined value, the above-mentioned switching device is forced to turn OFF. As a result, the supply of the current to the base of the power transistor is stopped.

In other words, in the afore-mentioned former conventional apparatus, when there is a possibility that a discharge will be made at an insufficient turning ON of the power transistor 34, there is a possibility of damaging the power transistor 34. On the other hand, the ON-signal of the latter apparatus is prevented from supply to the power transistor thereby to retain the power transistor in OFF state. Therefore, the power transistor of the latter apparatus is certainly prevent from breaking down.

In the above-mentioned two prior arts, which were filed by the same assignee, the former art has the problem, that, though the circuit is simplified by using the power source both for the power transistor 3 in series to the flush tube 3 and for operation control of the trigger circuit 5, the operation efficiency of the trigger circuit 6 may be low and the power transistor 34 is liable to be broken.

On the other hand, the latter prior art has the problem that although it has a measure that the output voltage of the power source is detected, the prior art can not well coup with the case where the turn-ON signal to the base of the power transistor is not sufficient while the output of the power source already becomes sufficiently large. Furthermore, the latter prior art has the shortcoming of complicated configuration, since it needs the voltage detecting circuit which always detects the voltage of the power source, and manufacturing cost increases because of large number of components; and still furthermore, electric power consumption is large, since a separate electric power is used for driving the voltage detecting circuit.

OBJECT AND SUMMARY OF THE INVENTION

An object of the present invention is to provide an electric flash apparatus which can prevent lowering of operation efficient of a trigger circuit and braking down of a power transistor induced by dropping of output voltage of a power source or insufficient voltage level of ON signal, wherein the power source for driving the power transistor, such as, an insulated gate bipolar transistor (I.G.B.T.) connected in series to a flash tube is also used as the power source for operation control of the trigger circuit.

In order to achieve the above-mentioned objects, the electric flash apparatus of the present invention comprises:

a main capacitor which is connected in parallel to a DC high voltage power source;

a series connection branch having a flash tube and a power transistor, which is connected in parallel to the main capacitor;

a power source circuit for supplying driving signal to the gate of the power transistor through an input electrode of a first switching device when the first switching device turns ON;

a second switching device which is operated to turn ON by a signal from the power source circuit;

a trigger circuit having a trigger capacitor and a trigger transformer for triggering the flash tube when the second switching device turns ON;

constant voltage switching means, which is connected between the output electrode of the first switching device and the gate of the second switching device and is operated to issue a voltage for turning the second switching device ON upon reception of a preset voltage through the first switching device;

an ON-signal generating circuit which is actuated when the flash tube is forced to emit light, and which issues an ON signal for turning the first switching device to ON state; and a light emission control circuit having an OFF-signal generating circuit which issues an OFF signal when light emission of the flash tube is to be stopped, to turn the power transistor OFF.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

Figure 1:
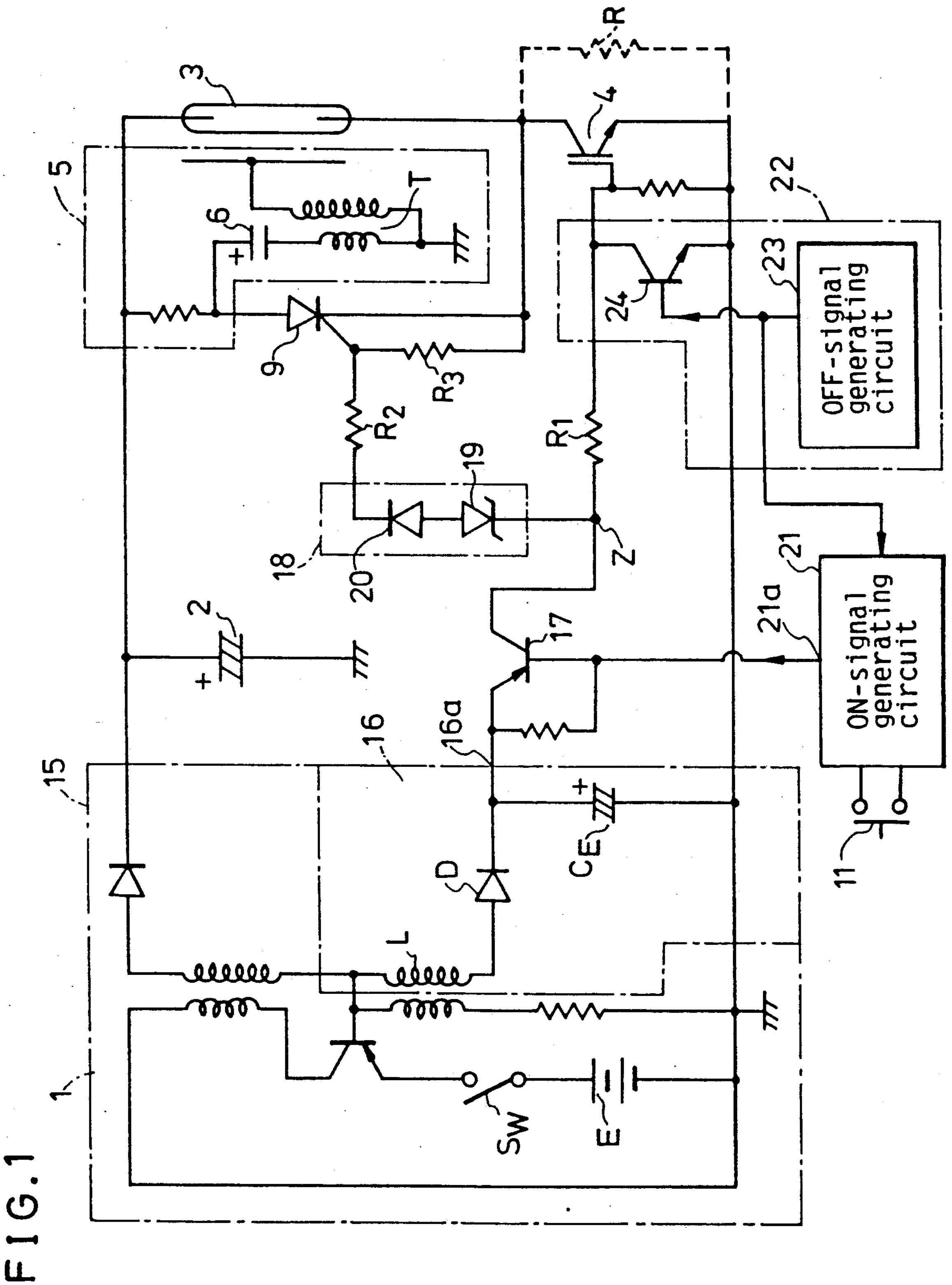
FIG. 1 is a circuit diagram of electric circuit of a first embodiment of an electric flash apparatus according to the present invention.
Figure 2:
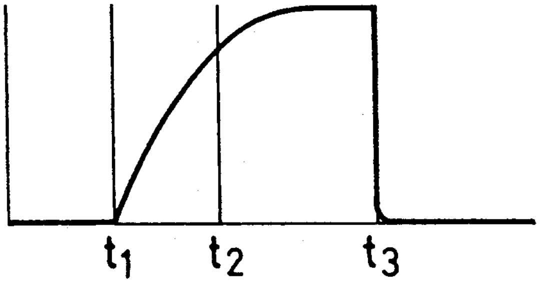
FIG. 2(*a*), FIG. 2(*b*) and FIG. 2(*c*) are wave form charts showing the timing operation of the first embodiment.
Figure 2:
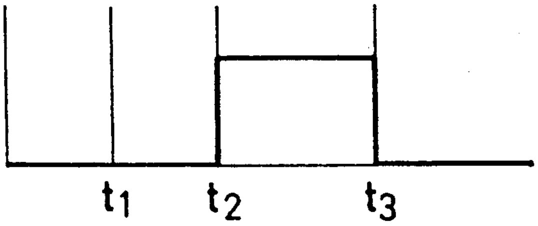
Figure 2:
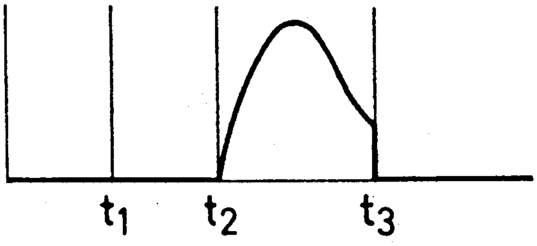

Hereafter, a first embodiment according to the present invention is described with reference to the accompanying drawings FIG. 1, FIG. 2(*a*), FIG. 2(*b*) and FIG. 2(*c*). FIG. 1 is a circuit diagram of electric circuit of the first embodiment of the electric flash apparatus. FIG. 2(*a*), FIG. 2(*b*) and FIG. 2(*c*) are wave form charts showing the timing operation of the first embodiment.

Figure 7:
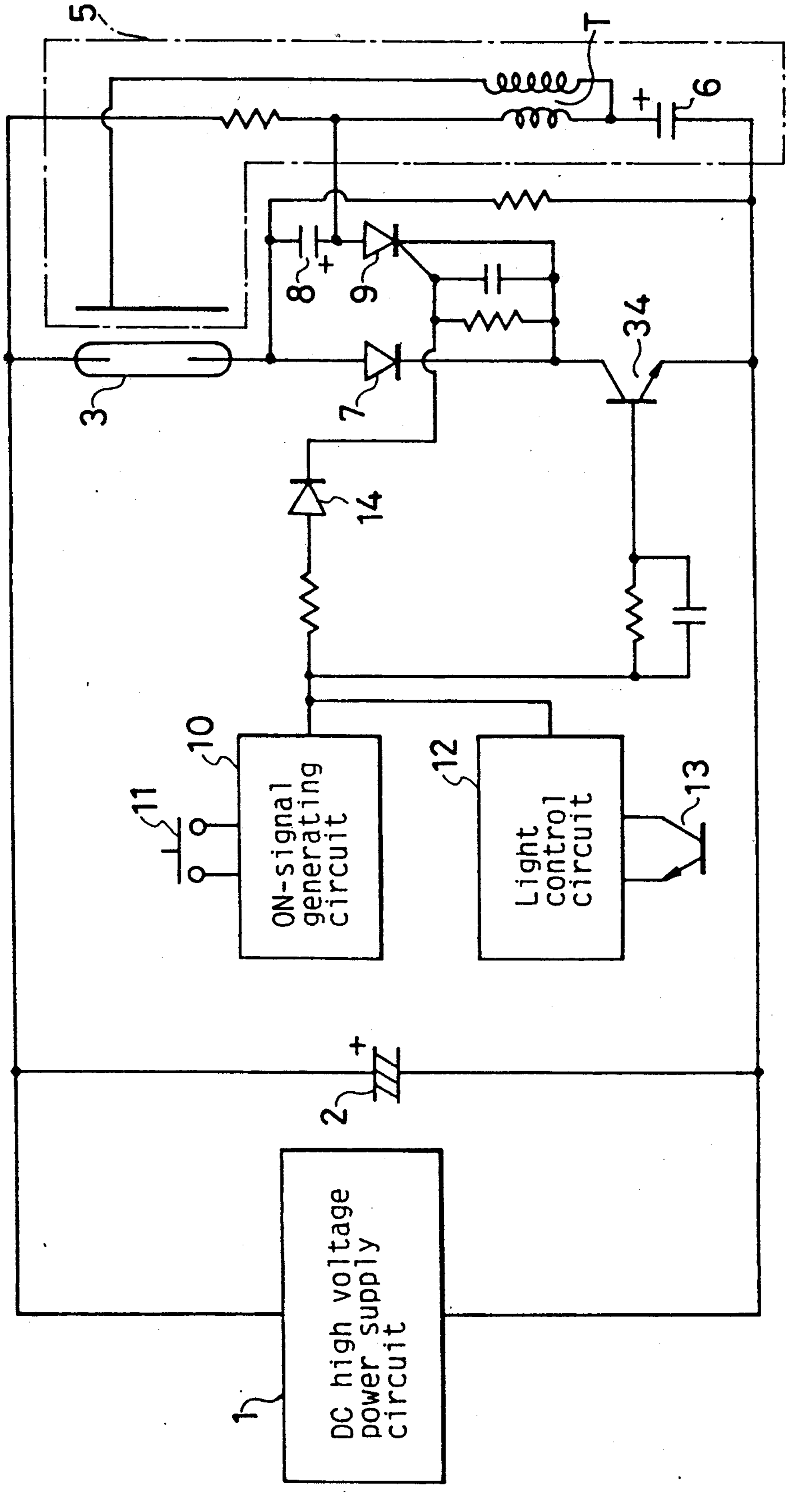
FIG.7 (Prior Art)
FIG. 7 is a circuit diagram of electric circuit in the prior art.

In FIG. 1, corresponding parts and components to the afore-mentioned conventional electric flash apparatus shown in FIG. 7 are shown by the same numerals, and have same functions, respectively.

A power source circuit 15 comprises a known DC-DC converter circuit as a DC high voltage supply circuit 1 and an operation power supply circuit 16 having an auxiliary winding L of a transformer, a diode D and a capacitor $C_E$ for operation power supply.

An output terminal 16*a* of the operation power supply circuit 16 is connected to the emitter of a transistor 17 as a switching device. The collector of the transistor 17 is connected to the gate of an insulated gate bipolar transistor (hereinafter referred to an I.G.B.T.) 4 of a power transistor through a resistor $R_1$.

The collector of the transistor 17, or a junction point "Z" shown in FIG. 1 is connected to the cathode of a Zener diode 19 as a constant voltage switching circuit which issues output voltage when a voltage is applied thereto. A series connection branch 18 comprises the Zener diode 19 and a diode 20 whereof the anode is connected to the anode of the Zener diode 19.

The cathode of the diode 20 is connected to the gate of thyristor 9 through a resistor $R_2$. The thyristor 9 is used as a switching device for controlling the operation of a trigger circuit 5.

In other words, the output terminal 16*a* of the operation power supply circuit 16 is connected to the gate of the I.G.B.T. 4 through the emitter-collector circuit of the transistor 17 and the resistor $R_1$, and also to the gate of the thyristor 9 further through the series connection branch 18.

When a synchronous switch 11 is closed for making the flash tube 3 to emit light, the ON-signal generating circuit 21 is actuated to issue an ON signal to the base of the transistor 17. Thereby, the transistor 17 turns ON, and the operation power supply circuit 16 and the gate of the I.G.B.T. 4 are electrically connected. There is no need to say that the ON-signal generating circuit 21 of this first embodiment issues an ON signal of a low level.

Light emission of the flash tube 3 may be made not only by closing operation of the synchronous switch 11, but also by an electrical signal which is arbitrarily supplied by a camera, etc. And of course, the ON-signal generating circuit 21 in the first embodiment may be constituted so as to receive such signal. That is, the ON-signal generating circuit 21 is the circuit which issues output signal at the instance when the flash tube is to be flashed.

Furthermore, the operation of the ON-signal generating circuit 21 is controlled also by an operation of an OFF-signal generating circuit 23 of alight emission control circuit 22. The OFF-signal generating circuit 23 comprises a known light control circuit. For example, the light control circuit is operated when the integration value of the light reflected from an object due to light emitted from the flash tube 3 reaches a preset value. The light control circuit stops the light emission of the flash tube 3 when the light emission is to be stopped. Furthermore, when the OFF-signal generating circuit 23 is operated, a transistor 24 which is a switching device of the light emission control circuit 22 turns ON, and also the ON-signal generating circuit 21 turns OFF and changes its output to the transistor 17 to turn OFF.

The transistor 24 is connected by its emitter and collector across the gate and the emitter of the I.G.B.T. 4, respectively. The I.G.B.T. 4 is turned to OFF state when the transistor 24 turns ON, as a matter of course.

Next, operation of the above-mentioned first embodiment is described with reference to the accompanying drawings FIG. 1, FIG. 2(*a*), FIG. 2(*b*) and FIG. 2(*c*).

Now, the DC-DC converter circuit of the DC high voltage supply circuit 1 is actuated by a low voltage power source E when its power source switch Sw is turned ON. And, the power source circuit 15 starts a known operation of generating a high voltage current. The main capacitor 2, the trigger capacitor 6 of the trigger circuit 5 and a power source capacitor $C_E$ of the operation power supply circuit 16 are charged with the polarity as shown in FIG. 1.

At the point of time $t_1$ shown in FIG. 2(*a*), FIG. 2(*b*) and FIG. 2(*c*) when the main capacitor 2, the trigger capacitor and the power source capacitor $C_E$ have completed their charging, the ON-signál generating circuit 21 is operated when the synchronous switch 11 is closed. By the operated ON-signal generating circuit 21, for example, a low level signal is applied at the output terminal 21*a* which was kept in an electrical open state.

when the electric potential of the output terminal 21*a* is turned to the low level state, the transistor 17 turns ON. As a result, the series connection branch 18 is connected to the output terminal 16*a* of the operation power supply circuit 16. Since the gate of the I.G.B.T. 4 has some stray capacitance, an electric potential at the junction point "Z" increases gradually after the point of time $t_1$ in the detailed consideration as shown in FIG. 2(*a*). FIG. 2(*a*) is a wave form chart showing an electric potential at the junction point "Z". In a part of time close after the point of time $t_1$, the I.G.B.T. 4 is insufficiently turned ON, because the electric potential of the junction point "Z" is still in a low level.

And, at immediately after the point of time $t_1$, the electric potential of the junction point "Z" does not yet reach a Zener voltage of the Zener diode 19. An electric potential of the gate of the thyristor 9 is kept in a low level as shown in FIG. 2(*b*), FIG. 2(*b*) is a wave form chart showing an electric potential at the gate of the thyristor 9.

The electric potential of the junction point "Z" further increases, and the I.G.B.T. 4 is sufficiently turned ON. At the above-mentioned point of time $t_2$ when the voltage between the junction point "Z" and the ground reaches the Zener voltage, the Zener diode 19 turns ON. And the output voltage of the operation power supply circuit 16 is applied o the gate of the thyristor 9. Therefore, the electric potential at the gate of the thyristor 9 becomes high level at the point of time $t_2$ as shown in FIG. 2(*b*) whereby the thyristor 9 turns ON.

As a result, the electric charge of the trigger capacitor 6 is discharged through the thyristor 9 etc. whereby the trigger circuit 5 is operated. The flash tube 3 emits light by using the electric charge of the main capacitor 2 as shown in FIG. 2(*c* ) when the trigger circuit 5 is operated. FIG. 2(*c*) is a wave form chart showing a discharge current of the flash tube 3.

In the light emission of the flash tube 3, the Zener voltage of the Zener diode 19 is so selected that the potential of the junction point "Z" is higher than a Zener voltage of the Zener diode 19 when the gate potential of the I.G.B.T. 4 is at such potential as to make the I.G.B.T. 4 sufficiently ON. Therefore, even if the output voltage of the operation power supply circuit 16 decreases the electric potential level of the junction point "Z" becomes lower level than the Zener voltage, or even if an ON signal which is increased gradually is applied to the I.G.B.T. 4, the thyristor 9 remains in OFF state until the electric potential level of the junction point "Z" reaches the Zener voltage. In other words, the trigger circuit 5 is operated only after the I.G.B.T. 4 is turned to sufficient ON state.

After start of emission of light by the flash tube 3, when the known light control circuit, for example, the OFF-signal generating circuit 23 of the emission control circuit 22 is actuated at the point of time $t_3$, the operation of the ON-signal generating circuit 21 is stopped. Namely, the output terminal 21*a* is restored to OFF state, and at the same time, the transistor 24 turns ON. Therefore, at the above-mentioned point of time $t_3$, the transistor 17 turns OFF, and the electric power from the operation power supply circuit 16 is stopped of supplying voltage to the gate of the I.G.B.T. 4 and the gate of the thyristor 9. As shown in FIG. 2(*a*) and FIG. 2(*b*), both the electric potentials of the gate of the I.G.B.T. 4 and the gate of the thyristor 9 are kept in low level (L). As shown in FIG. 1, the gate and the emitter of the I.G.B.T. 4 are Shortcircuitted by the actuated transistor 24.

As a result, the I.G.B.T. 4 turns OFF, and the current flowing in the flash tube 3 is instantly cut off at the point of time $t_3$ and light emission is stopped as shown in FIG. 2(*c*).

As above-mentioned, the trigger circuit 5 of the first embodiment is actuated by turning ON of the thyristor 9. The ON state of the thyristor 9 is forced by operating of the series connection branch 18 having the Zener diode 19 which is changed to ON state at above the preset constant voltage when the I.G.B.T. 4 sufficiently turns ON. In other words, when the trigger circuit 5 is operated, the voltage which actuates the I.G.B.T. 4 to sufficiently turn ON is applied to the I.G.B.T. 4 by the operation of the series connection branch 18. Accordingly, the trigger circuit 5 is operated efficiently, and the I.G.B.T. 4 of the power transistor is prevented from breaking down.

Furthermore, a resistor R shown in FIG. 1 by a dotted line may be connected in parallel to the I.G.B.T. 4 in order to prevent the undesirable ON operation, which is induced by a stray capacitance of the I.G.B.T. 4 when the output voltage of the operation power supply circuit 16 is applied to the gate of the I.G.B.T. 4.

Although the I.G.B.T. 4 as a power transistor is used in the first embodiment, a field effect transistor (FET)

or a general power transistor can be used instead of the I.G.B.T. 4.

Figure 3:
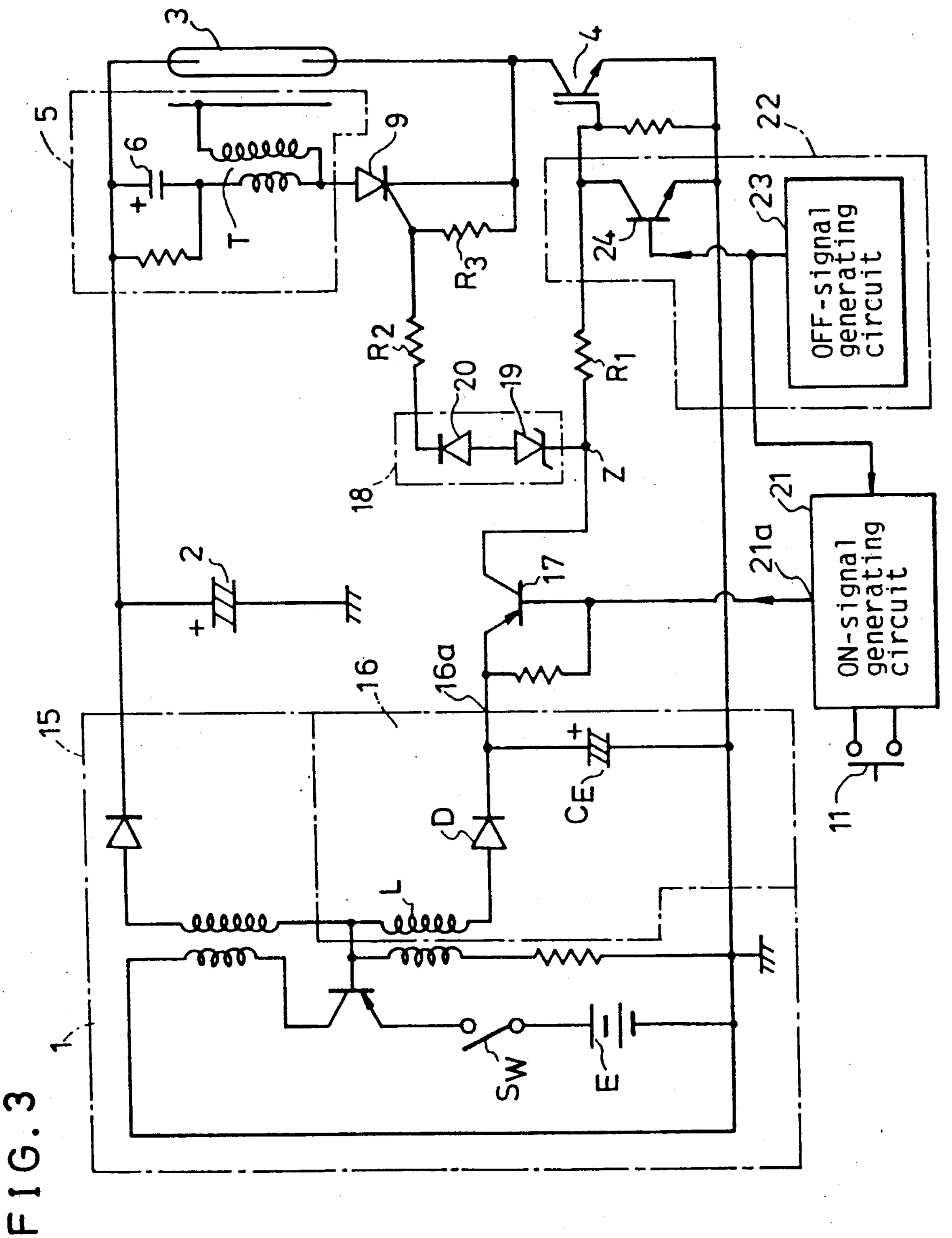
FIG. 3 is a circuit diagram of electric circuit of a second embodiment of the electric flash apparatus according to the present invention.

Although the above-mentioned first embodiment, the triggering of the flash tube 3 is made by the discharge of the trigger capacitor 6 of the trigger circuit 5, means for triggering the flash tube 3 is not limited to the above-mention means. For instance, the flash tube 3 may also be actuated by charging operation of the electrical circuit of the second embodiment shown in FIG. 3. FIG. 3 is a circuit diagram of electric circuit of the second embodiment of the electric flash apparatus in accordance with the present invention. Corresponding parts and components to the first embodiment are shown by the same numeral and marks, and the description thereon made in the first embodiment similarly apply.

Figure 4:
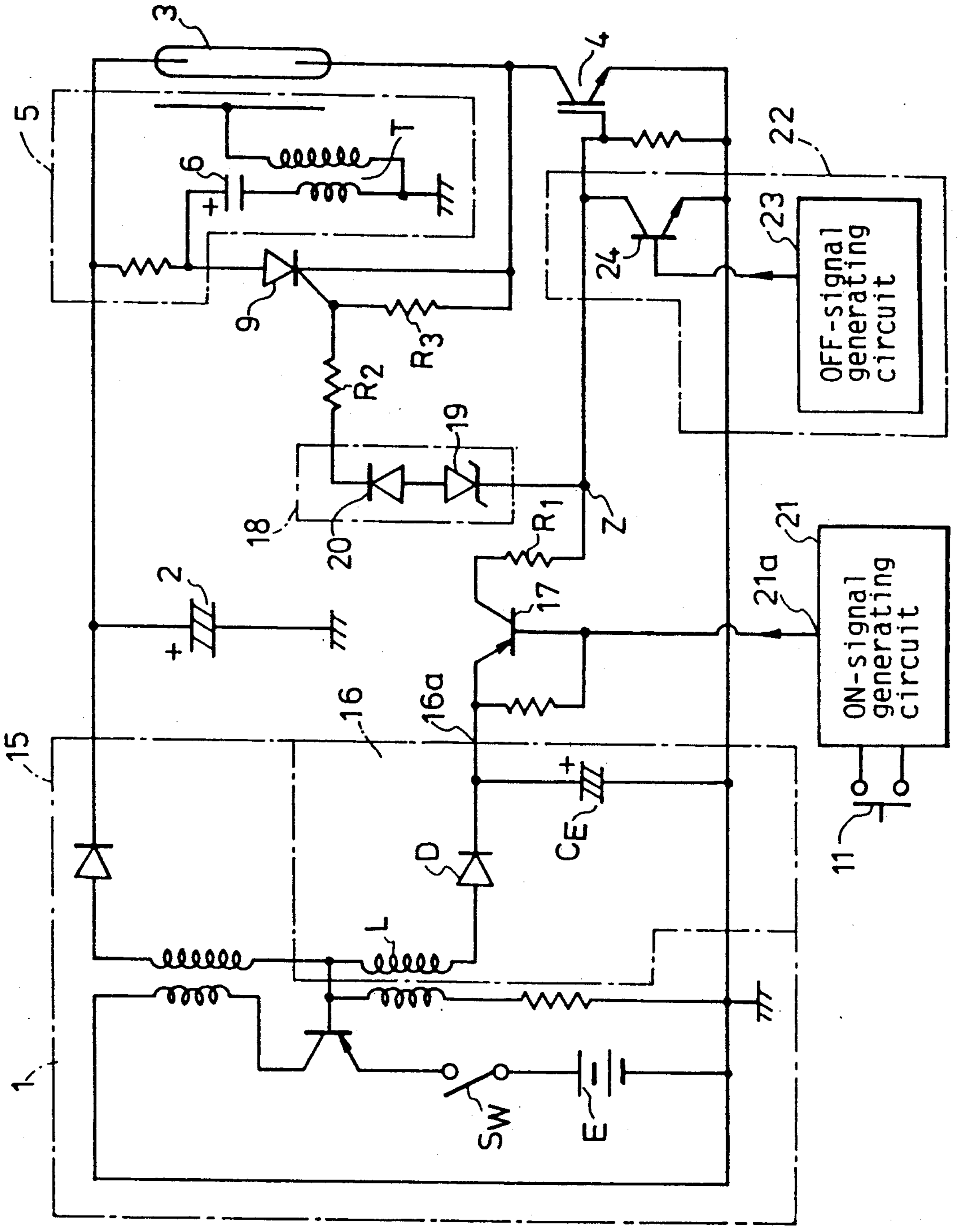
FIG. 4 is a circuit diagram of electric circuit of a third embodiment of the electric flash apparatus according to the present invention.

FIG. 4 is a circuit diagram of electric circuit of a third embodiment of the electric flash apparatus in accordance with the present invention. Corresponding parts and components to the first embodiment are shown by the same numerals and marks, and the description thereon made in the first embodiment similarly apply. Differences and features of this third embodiment from the first embodiment are as follows.

In the third embodiment, the cathode of the Zener diode 19 as a constant voltage switching circuit which issues output voltage when a voltage is applied thereto is directly connected by one end to the gate of the I.G.B.T. 4. The cathode of the Zener diode 19 is connected to the collector of the transistor 17 through the resistor $R_1$. On account of the direct connection of the cathode of the Zener diode 19 to the gate of the I.G.B.T. 4, the voltage to be applied to the gate of the I.G.B.T. 4 is accurately detected by using a Zener voltage.

Furthermore, a signal of the OFF-signal generating circuit 23 of the emission control circuit 22 is not transmitted to the ON-signal generating circuit 21 in the third embodiment. Therefore, the operations of the OFF-signal generating circuit 23 and the ON-signal generating circuit 21 are independent from each other.

In the above-mentioned third embodiment, the duty time of the ON signal, which is issued by the ON-signal generating circuit 21, is selected to have a predetermined interval determined considering the whole discharge time interval of the flash tube 3.

Figure 5:
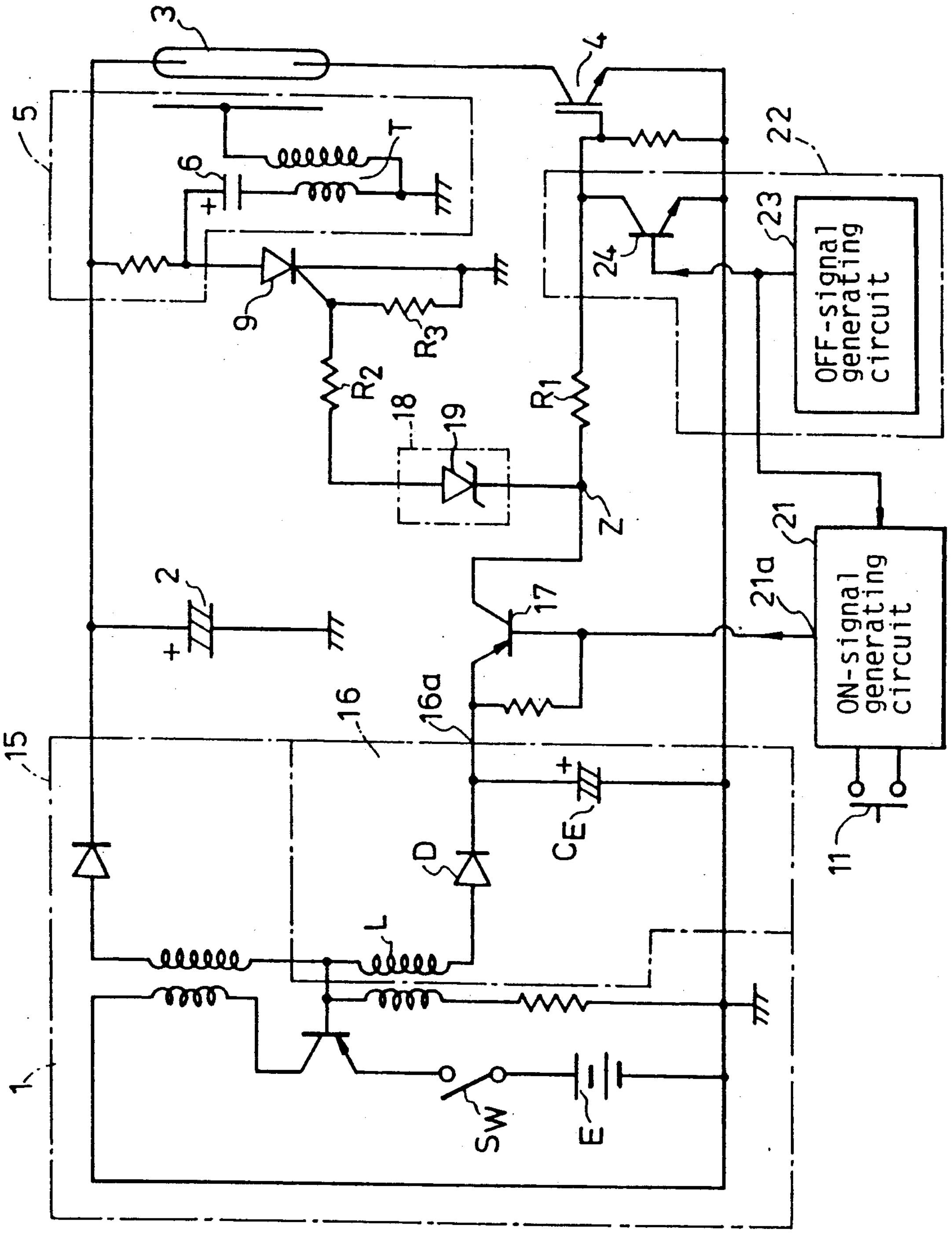
FIG. 5 is a circuit diagram of electric circuit of a fourth embodiment of the electric flash apparatus according to the present invention.

FIG. 5 is a circuit diagram of electric circuit of a fourth embodiment of the electric flash apparatus in accordance with the present invention. Corresponding parts and components to the first embodiment are shown by the same numerals and marks, and the description thereon made in the first embodiment similarly apply. Differences and features of this fourth embodiment from the first embodiment are as follows.

In the fourth embodiment, the cathode of the thyristor 9, which is a switching device for controlling the operation of the trigger circuit 5, is connected directly to the grounds. And, the diode 20, which is shown in FIG. 1 of the first embodiment, is not provided in this fourth embodiment of FIG. 5.

In the first embodiment of FIG. 1, the cathode of the thyristor 9 is directly connected to the collector of the I.G.B.T. 4, and hence, the diode 20 is provided to prevent undesirable current from the flash tube 3 through the cathode and the gate of the thyristor 9 to the Zener diode 19. In the fourth embodiment, however, the above-mentioned reverse current is not generated because the cathode of the thyristor 9 is grounded, and hence there is no need of a series connection of a diode to the Zener diode 19, as in FIG. 1.

However, in the fourth embodiment, repetition of light emission in high speed (highly frequent) is difficult because a discharging of the electric charge of the trigger capacitor 6 is made exhaustingly to the ground without the I.G.B.T. 4 of FIG. 1.

Although the connecting positions of the resistor $R_1$, and the relation between the OFF-signal generating circuit 23 and the ON-signal generating circuit 21 are shown by the same circuits as shown in FIG. 1 and FIG. 3, they may be modified like the third embodiment shown in FIG. 4.

Figure 6:
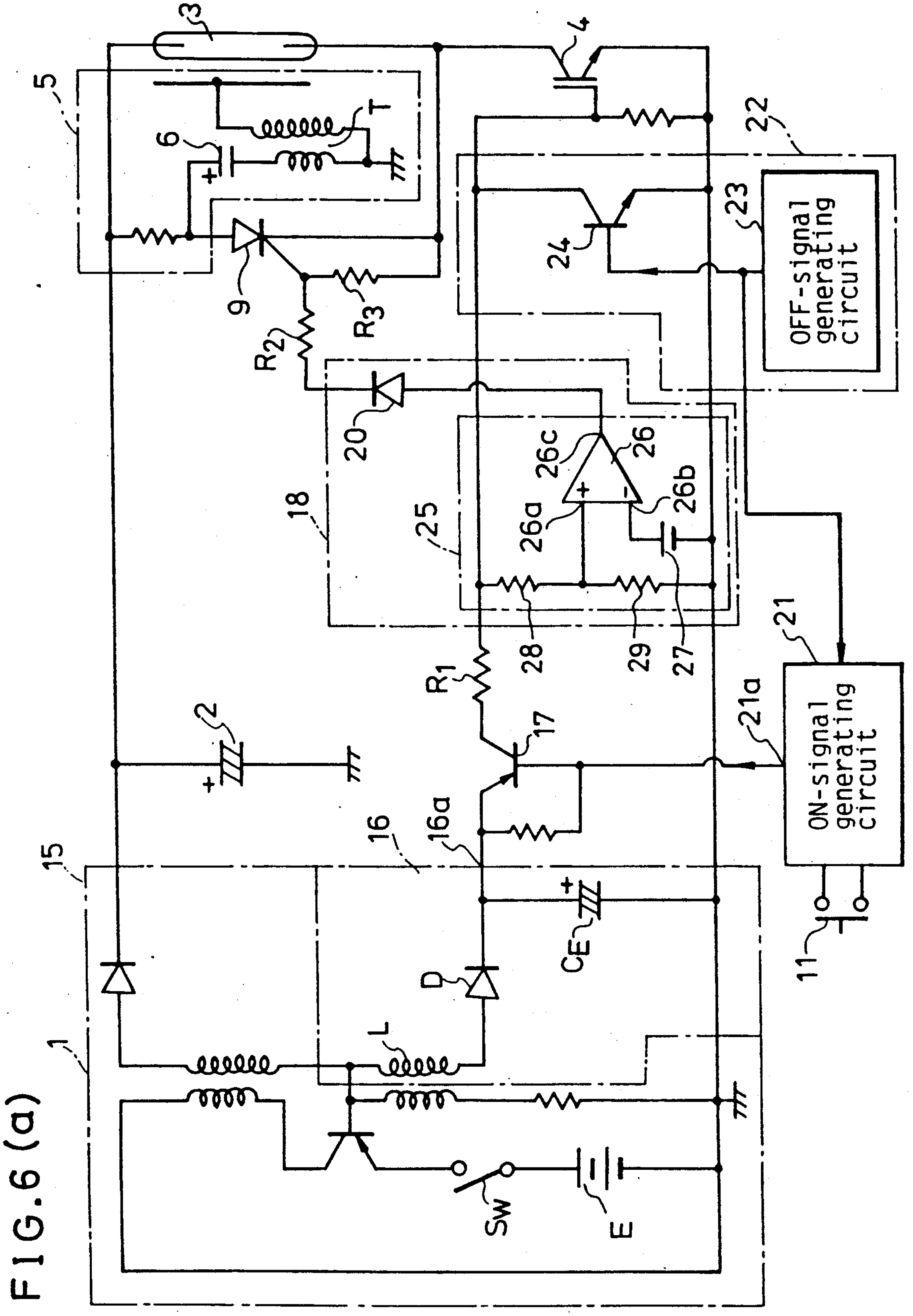
FIG. 6(*a*) and FIG. 6(*b*) are circuit diagrams of electric circuit of a fifth embodiment of the electric flash apparatus according to the present invention.
Figure 6B:
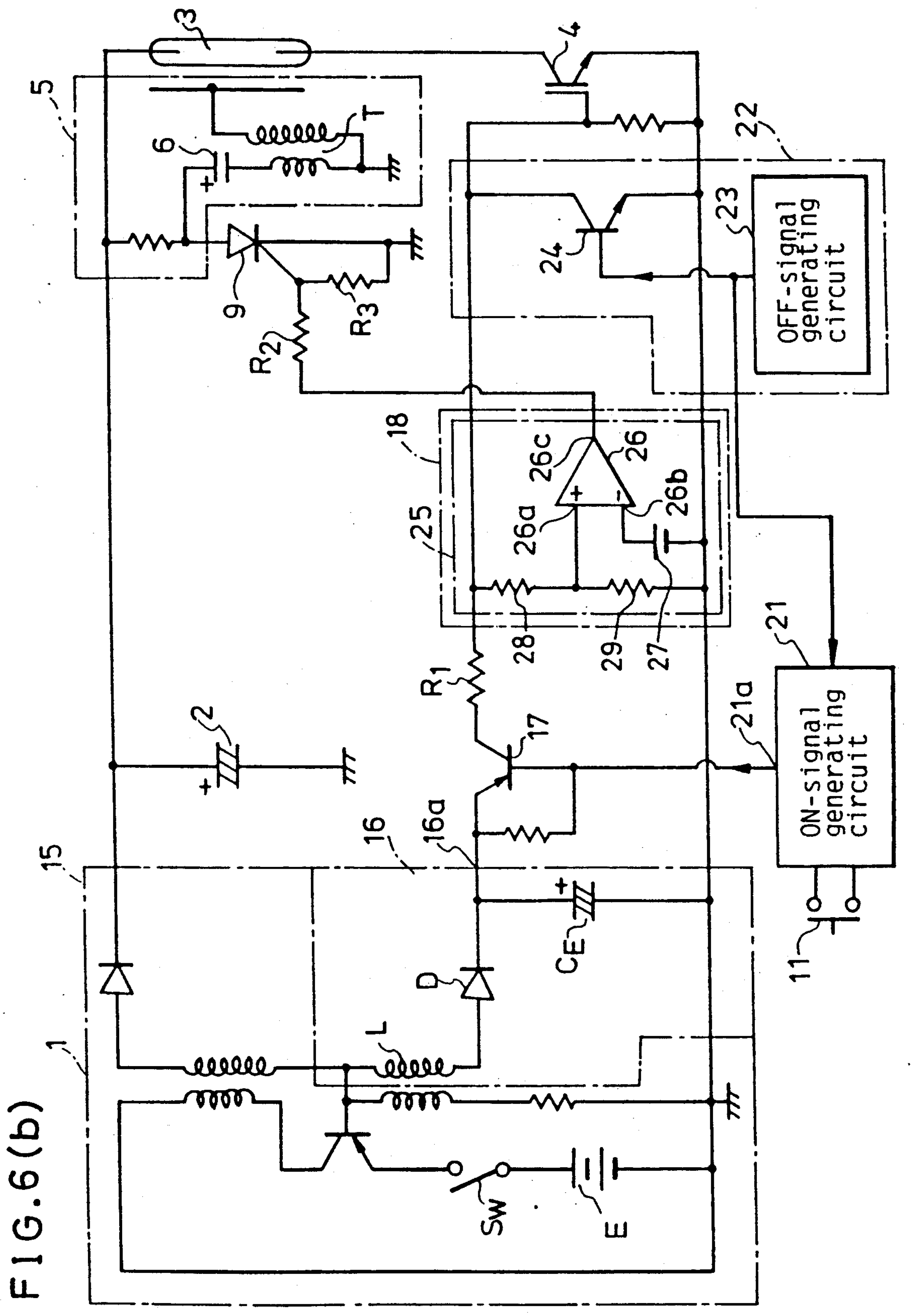

FIG. 6(*a*) and FIG. 6(*b*) are circuit diagrams of electric circuit of a fifth embodiment of the electric flash apparatus in accordance with the present invention. Corresponding parts and components to the first embodiment are shown by the same numerals and marks.

In the fifth embodiment, a switching circuit 25 which turns at a preset constant voltage is provided instead of the Zener diode 19 of the afore-mentioned embodiments. The switching circuit 25 comprises a comparator 26, a reference power source 27 and resistors 28, 29. The output power of the operation power supply circuit 16 passes through the switching circuit 25 and is applied to the gate of the thyristor 9. Corresponding parts and components to the first embodiment are shown by the same numerals and marks, and the description thereon made in the first embodiment similarly apply. Differences and features of this fifth embodiment from the first embodiment are as follows.

In the fifth embodiments shown in FIG. 6(*a*) and FIG. 6(*b*), when the output voltage of the operation power supply circuit 16 is applied through the transistor 17 to the I.G.B.T. 4, the output voltage is also applied to the switching circuit 25. As a result, the above-mentioned output voltage is divided by the two resistors 28, 29 in the switching circuit 25, and the divided voltage is applied to a noninverting input terminal 26*a* of the comparator 26. The wave-form of the voltage which is applied to the noninverting input terminal 26*a* is in proportion to the afore-mentioned voltage shown in FIG. 2(*a*).

In the comparator 26, a reference voltage of a reference power source 27 is applied to an inverting input terminal 26*b* of the comparator 26. When the divided voltage applied to the noninverting input terminal 26*a* is higher than the reference voltage, the output voltage of the output terminal 26*c* of the comparator 26 is inverted and becomes high level signal.

The above-mentioned high level signal of the output terminal 26*c* is applied to the gate of the thyristor 9 through the diode 20 and the resistor $R_2$ in case of the embodiment shown in FIG. 6(*a*). In case of the other embodiment shown in FIG. 6(*b*), the high level signal which is issued from the comparator 26 is applied to the gate of it through the resistor $R_2$. And, the thyristor 9 turns ON in each case.

By setting the above-mentioned reference voltage at the desired voltage which makes the I.G.B.T. 4 to sufficiently turn ON, the thyristor 9 can be turned to ON state certainly after the turning ON of the I.G.B.T. 4, similarly to the afore-mentioned embodiments.

Accordingly, the trigger circuit 5 is operated efficiently, and the I.G.B.T. 4 of the power transistor is prevented from breaking down. The above-mentioned switching circuit 25 which turns at the preset constant voltage is coupled to the operati ɔower supply circuit 16 through the transistor 17. Therefore, the switching circuit 25 is operated only when the transistor 17 is in ON state. Provided that the reference power source 27 for issuing a reference voltage is constituted such that it issues the voltage only when the transistor 17 turns ON, the power source can be saved.

Furthermore, the connecting positions of the resistor $R_1$, and the relation between the OFF-signal generating circuit 23 and the ON-signal generating circuit 21 are shown by the same circuit as shown in FIG. 5, they may be modified like the third embodiment shown in FIG. 4.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An electric flash apparatus comprising:
  - a main capacitor which is connected in parallel to a DC high voltage power source;
  - a series connection branch having a flash tube and a power transistor which is connected in parallel to said main capacitor;
  - a power source circuit for supplying driving signal to the gate of said power transistor through a first switching device when said first switching device turns ON;
  - a trigger circuit having a trigger capacitor and a trigger transformer for triggering said flash tube when a second switching device turns ON;
  - a Zener diode whereof the cathode is connected to the gate of said power transistor, and the anode is connected to the gate of said second switching device;
  - an ON-signal generating circuit which is actuated when said flash tube is forced to emit light, and which issues an ON signal for turning said first switching device to ON state; and
  - a light emission control circuit having an OFF-signal generating circuit which issues an OFF signal when light emission of said flash tube is to be stopped, to turn said power transistor OFF and reset said ON-signal generating circuit to a standby state at reception of an OFF signal from said OFF-signal generating circuit.

2. An electric flash apparatus comprising:
  - a main capacitor which is connected in parallel to a DC high voltage power source;
  - a first series connection branch having a flash tube and a power transistor, which is connected in parallel to said main capacitor;
  - a power source circuit for supplying driving signal to the gate of said power transistor through a first switching device when said first switching device turns ON;
  - a second switching device whose a low potential terminal is connected to the collector of said power transistor;
  - a trigger circuit having a trigger capacitor and a trigger transformer for triggering said flash tube when said second switching device turns ON;
  - a second series connection branch having a Zener diode and a diode which are connected by both anode thereof, where the cathode of said Zener diode is connected to the gate of said power transistor and the cathode of said diode is connected to the gate of said second switching device;
  - an ON-signal generating circuit which is actuated when said flash tube is forced to emit light, and which issues an ON signal for turning said first switching device to ON state; and
  - a light emission control circuit having an OFF-signal generating circuit which issues an OFF signal when light emission of said flash tube is to be stopped, to turn said power transistor OFF and reset said ON-signal generating circuit to a standby state at reception of an OFF signal from said OFF-signal generating circuit.

3. An electric flash apparatus comprising:
  - a main capacitor which is connected in parallel to a DC high voltage power source;
  - a first series connection branch having a flash tube and an insulated gate bipolar transistor (I.G.B.T.), which is connected in parallel to said main capacitor;
  - a power source circuit for supplying driving signal to the gate of said I.G.B.T. through an input electrode of a first switching device when said first switching device turns ON;
  - a second switching device which is operated to turn ON by a signal from said power source circuit;
  - a trigger circuit having a trigger capacitor and a trigger transformer for triggering said flash tube when said second switching device turns ON;
  - constant voltage switching means, which is connected between the output electrode of said first switching device and the gate of said second switching device and is operated to issue a voltage for turning said second switching device ON upon reception of a preset voltage through said first switching device;
  - an ON-signal generating circuit which is actuated when said flash tube is forced to emit light, and which issues an ON signal for turning said first switching device to ON state; and
  - a light emission control circuit having an OFF-signal generating circuit which issues an OFF signal when light emission of said flash tube is to be stopped, to turn said I.G.B.T. OFF.

4. An electric flash apparatus in accordance with claim 3, wherein
  - said constant voltage switching means is directly connected to said first switching device, and a connecting point between said constant voltage switching means and said first switching device is connected to the gate of said I.G.B.T. through a resistor.

5. An electric flash apparatus in accordance with claim 3, wherein
  - said constant voltage switching means is connected to said first switching device through a resistor, and a connecting point between said constant voltage switching means and said resistor is connected to the gate of said I.G.B.T.

6. An electric flash apparatus in accordance with claim 3, 4, or 5, wherein
  - said second switching device where a low potential terminal is grounded, and
  - said constant voltage switching means comprises a Zener diode where the cathode is connected to said power source circuit through said first switching device, and where the anode is connected to the gate of said second switching device.

7. An electric flash apparatus in accordance with claim 3, 4 or 5, wherein said second switching device where a low potential terminal is connected to a connecting point between said I.G.B.T. and said flash tube, and said constant voltage switching means comprises a Zener diode where the cathode is connected to said power source circuit through said first switching device, and where the anode is connected to the gate of said second switching device through a forward diode.

8. An electric flash apparatus in accordance with 3, 4 or 5, wherein said second switching device where a low potential terminal is grounded, and said constant voltage switching circuit comprises (a) plural resistors which are connected in series to said power source circuit through said first switching device, (b) a comparator where a noninverting input terminal is connected to a connecting point between said plural resistors, where an inverting input terminal is connected to a reference power source, and where an output terminal is connected to the gate of said second switching device.

9. An electric flash apparatus in accordance with 3, 4 or 5, wherein said second switching device where a low potential terminal is connected to a connecting point between said I.G.B.T. and said flash tube, said constant voltage switching circuit comprises (a) plural resistors which are connected in series to said power source circuit through said first switching device.

(b) a comparator where a noninverting input terminal is connected to a connecting point between said plural resistors, where an inverting input terminal is connected to a reference power source, and where an output terminal is connected to the gate of said second switching device through a forward diode.

10. An electric flash apparatus in accordance with 3, wherein said emission control circuit where an OFF signal which is issued by said OFF-signal generating circuit makes said ON-signal generating circuit to return to non-operation state.

* * * * *